US009709216B2

(12) United States Patent
Zing

(10) Patent No.: US 9,709,216 B2
(45) Date of Patent: Jul. 18, 2017

(54) SAFETY SECURING APPARATUS

(71) Applicant: Spencer Zing, Chatsworth, CA (US)

(72) Inventor: Spencer Zing, Chatsworth, CA (US)

(*) Notice: Subject to any disclaimer, the term of this patent is extended or adjusted under 35 U.S.C. 154(b) by 0 days.

(21) Appl. No.: 15/068,173

(22) Filed: Mar. 11, 2016

(65) Prior Publication Data
US 2016/0265715 A1 Sep. 15, 2016

Related U.S. Application Data

(60) Provisional application No. 62/133,200, filed on Mar. 13, 2015.

(51) Int. Cl.
F16M 13/02 (2006.01)
F16M 11/10 (2006.01)
F16B 9/00 (2006.01)
A47B 53/00 (2006.01)
F16B 11/00 (2006.01)

(52) U.S. Cl.
CPC .......... *F16M 13/02* (2013.01); *F16M 13/025* (2013.01); *A47B 53/00* (2013.01); *F16B 9/00* (2013.01); *F16B 11/006* (2013.01); *F16M 11/10* (2013.01)

(58) Field of Classification Search
CPC ...... F16M 11/10; F16M 13/02; F16M 13/025; F16B 9/00; F16B 11/006; A47B 53/00
USPC ..... 248/122.1, 205.3, 221.11, 225.11, 274.1, 248/351, 447; 312/132
See application file for complete search history.

(56) References Cited

U.S. PATENT DOCUMENTS

| 4,304,078 | A | * | 12/1981 | Meriwether, Jr. | ... E04F 21/0015 248/354.3 |
| 4,936,640 | A | * | 6/1990 | Pratzer | .................. E05B 65/464 312/221 |
| 5,975,183 | A | * | 11/1999 | Reis | ........................ B29C 73/12 100/211 |
| 6,328,510 | B1 | * | 12/2001 | Hanrath | ............... B23Q 1/4861 33/1 M |
| 6,817,145 | B2 | * | 11/2004 | Chen | .................... B65G 49/061 248/206.3 |
| 7,334,304 | B2 | * | 2/2008 | Grossmann | .......... B23Q 1/5462 29/27 C |
| 7,857,628 | B2 | * | 12/2010 | Chung | ............. H01R 13/62988 439/59 |
| 8,087,624 | B2 | * | 1/2012 | Varney | .................... F16M 11/10 248/125.8 |
| 2006/0278795 | A1 | * | 12/2006 | Lee | ........................ F16M 11/10 248/371 |

* cited by examiner

Primary Examiner — Tan Le
(74) Attorney, Agent, or Firm — Kelly & Kelley, LLP

(57) ABSTRACT

A safety device for securing a television or similar household item against tipping or rocking. The safety device has a pair of base units and a pair of locking arms. The base units are secured to the television and a nearby wall by adhesive or other reliable methods. The locking arms are each secured to one of the base units but a connection lug that permits pivoting movement. The locking arms are secured together by L-shaped studs, adjustment slots, and locking pins. The locking arms are rigid so as to prevent unwanted movement of the television.

19 Claims, 9 Drawing Sheets

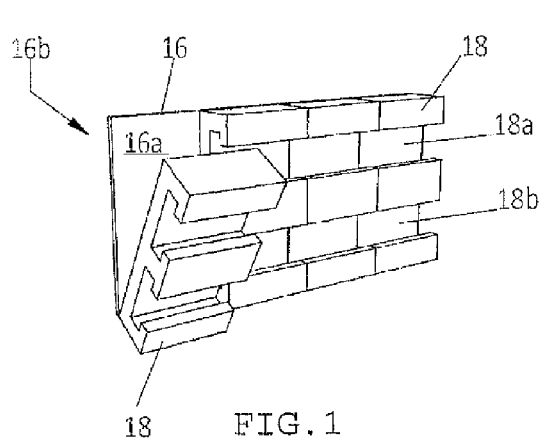
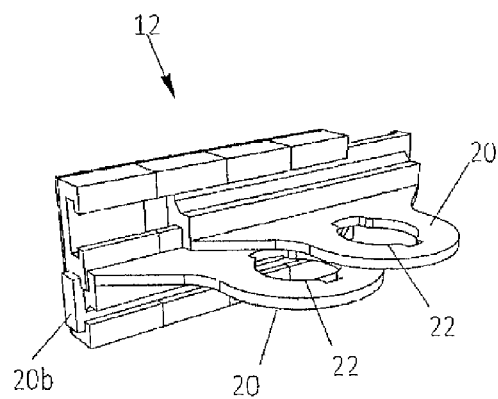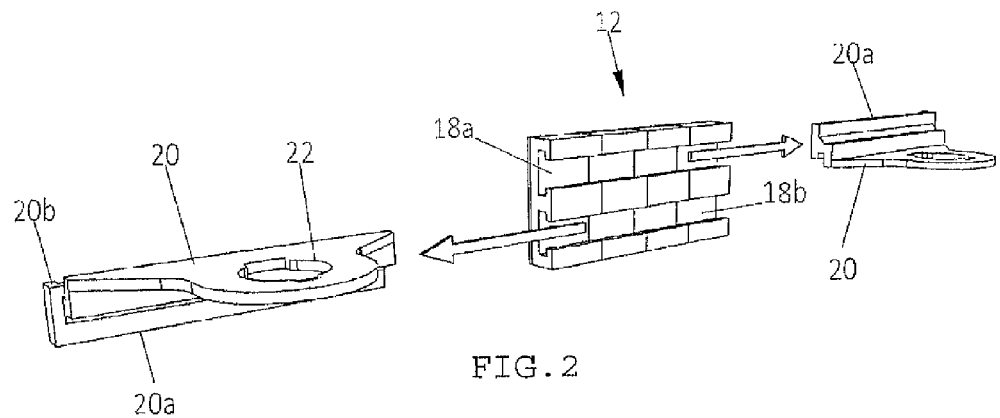
FIG. 1
FIG. 3
FIG. 2

SAFETY SECURING APPARATUS

RELATED APPLICATION

This application claims the benefit of U.S. Provisional Application No. 62/133,200, filed on Mar. 13, 2015.

BACKGROUND OF THE INVENTION

The present invention is directed to a safety device for appliances and furniture. More specifically, the present invention is directed to an anti-tip bracket intended for use with televisions, bookshelves and similar units.

Safety devices for the purposes contemplated by the present invention are known in the prior art. Such prior art devices typically consist of a flexible strap or band that attaches to the unit to be secured and the wall behind the unit. Such attachment is typically by threaded screw or similar fastener at one or both ends of the strap. Such fastener must necessarily pass through the exterior surface of the unit being secured and/or the wall to which it is attached. In each instance, the fastener preferably must engage a rigid or durable structure behind the exterior surface, i.e., a stud in the case of the wall. This restriction on attachment of the fastener necessarily limits the positions at which the prior art strap may be attached to the unit and the wall.

In addition, the flexible nature of the strap or band of such prior art safety devices creates the possibility of rocking of the unit being secured. The unit may tip forwards and/or backwards depending upon the amount of slack in the strap. Such rocking necessarily introduces higher stresses on the attachment of the fasteners to both the unit and the wall. Such increased stress can lead to separation of the fastener and failure of the safety device. In addition, rocking of the unit may cause impact between the unit and the wall or other nearby structures, which could cause damage to the unit, the wall, or nearby structure. In the case where the unit is a bookshelf or similar storage furniture, any items on the unit may fall off during rocking.

Accordingly, there is a need for an improved safety device that is easier to attach to a unit and/or wall with less damage and greater flexibility. In addition, there is a need to an improved safety device that minimizes rocking of the unit being secured. The present invention fulfills these needs and provides other related advantages.

SUMMARY OF THE INVENTION

The present invention is directed to a safety securing apparatus for securing, by way of example, a television to a wall so as to prevent tipping. The safety securing apparatus includes a first base unit pivotally connected to a first locking arm, a second base unit pivotally connected to a second locking arm, and a locking mechanism. The first base unit has an adhesive backing layer configured for securing the first base unit to a first surface. The second base unit has an adhesive backing layer configured for securing the second base unit to a second surface. The locking mechanism connects a free end of the first locking arm to a free end of the second locking arm. The locking mechanism, the first locking arm, and the second locking arm are configured to form a rigid bracket securing the first surface to the second surface.

The first base unit and the second base unit preferably each include a plurality of base tracks arranged side-by-side that define a pair of parallel grooves on each of the first base unit and the second base unit. The first base unit and the second base unit each further include a pair of eyelets, with each eyelet having a tongue for insertion into one of the pair of parallel grooves on each of the first base unit and the second base unit. Each of the pair of eyelets further has a stop bar at one end of the tongue.

The first base unit and the second base unit preferably each further have connection openings in an eyelet configured to receive a connection lug on each of the first locking arm and the second locking arm. The connection openings on the first base unit and the second base unit each have side notches configured to accept connection arms on the connection lug on each of the first locking arm and the second locking arm.

The first locking arm and the second locking arm each have an L-shaped stud adjacent to the free end and a plurality of adjustment slots spaced along a length of the first locking arm and the second locking arm. The L-shaped stud on each of the first locking arm and the second locking arm is configured to engage one of the plurality of adjustment slots on the second locking arm and the first locking arm. A pair of locking pins is configured to engage a locking slot on the free end of each of the first locking arm and the second locking arm, wherein the locking pin also engages one of the plurality of adjustment slots on the second locking arm and the first locking arm.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a schematic illustration of a plurality of base tracks and an adhesive strip for a first preferred embodiment of the safety device of the present invention;

FIG. 2 is a schematic illustration of the plurality of base tracks receiving a pair of matching eyelets for the first preferred embodiment of the safety device of the present invention;

FIG. 3 is a schematic illustration of a base unit for the first preferred embodiment of the safety device of the present invention having an adhesive strip, a plurality of base tracks, and a pair of matching eyelets;

DETAILED DESCRIPTION OF THE PREFERRED EMBODIMENTS

Figures 4, 5:
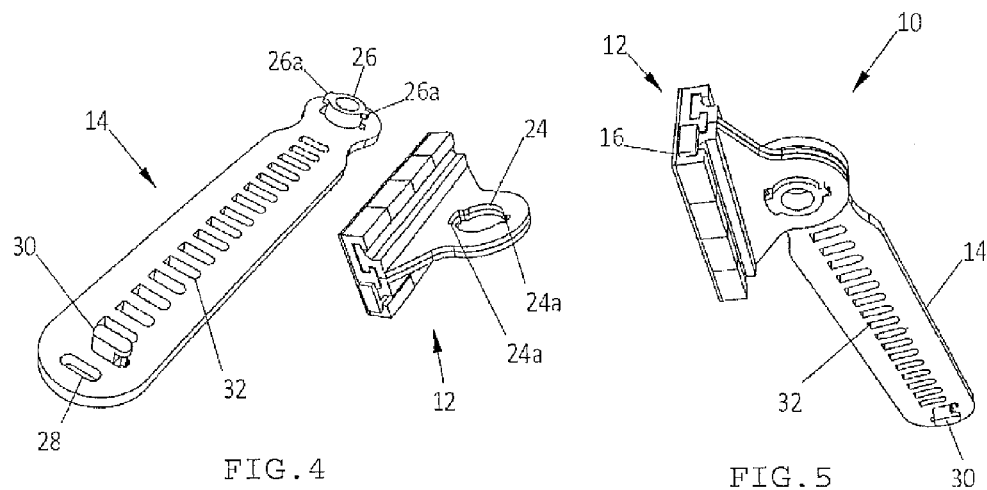
FIG. 4 is a schematic depiction of the base unit and a locking arm for the first preferred embodiment of the safety device of the present invention.
FIG. 5 is a bottom perspective illustration of an assembled base unit and locking arm for the first preferred embodiment of the safety device of the present invention.

The present invention is directed to a safety device designed to prevent a large screen television or monitor from being knocked over while being supported on an appropriate stand. The safety device secures the television to a wall behind the same. There is a need for such a safety device as one of the leading causes of an emergency room visit for a child is a television falling on them. Keeping the television from moving at all is a better solution to a prior art flexible strap, which can still allow a large range of movement, e.g., narrowing the distance between the television and the wall. Such narrowing movement will ordinarily continue until the television impacts the wall, creating a potentially damaging impact. Returning the prior art flexible strap to its fully extended position can cause stress and strain on the strap and attachment points, leading to failure if repeated too often.

In the following detailed description, the safety device of the present invention is generally referred to by reference numeral 10 in FIGS. 1-10. The individual components and the structural relationship of the components of the safety device 10 are most clearly shown in FIG. 9.

Figure 6:
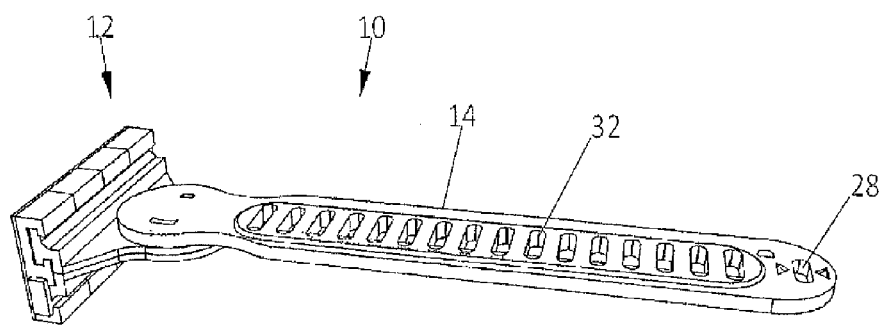
FIG. 6 is a top perspective illustration of an assembled base unit and locking arm for the first preferred embodiment of the safety device of the present invention.
Figure 7:
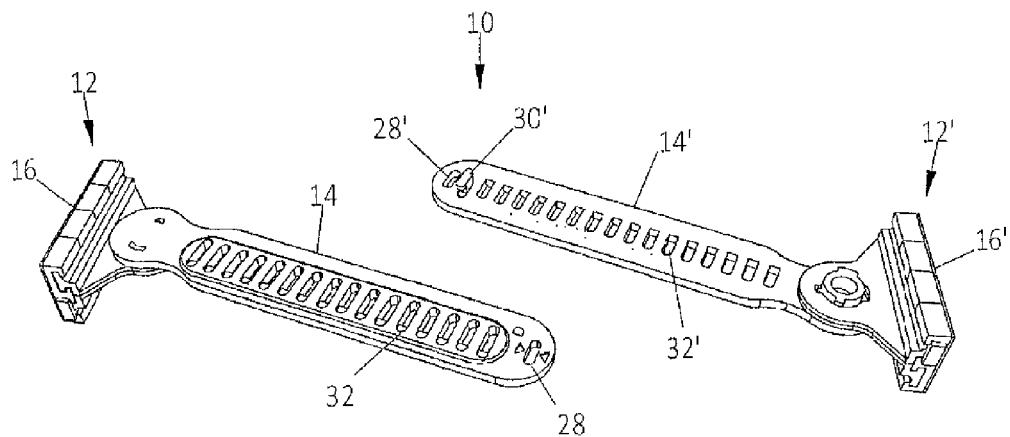
FIG. 7 is a top view illustration of a pair of assembled base units and locking arms for the first preferred embodiment of the safety device of the present invention.
Figure 8:
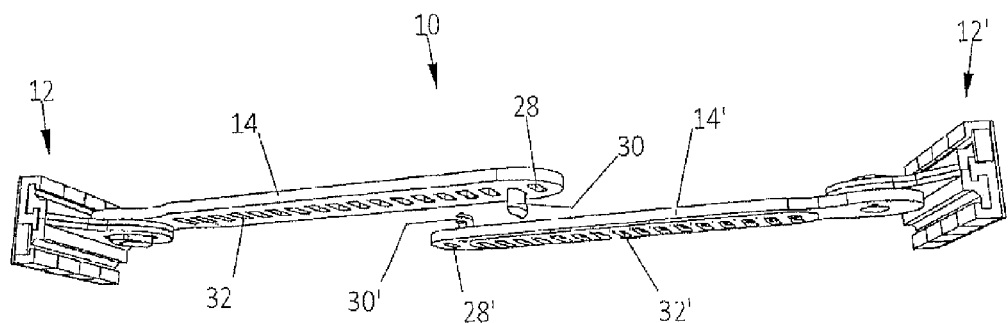
FIG. 8 is a front view illustration of a pair of assembled based units and locking arms for the first preferred embodiment of the safety device of the present invention with the locking arms aligned for connection.
Figure 9:
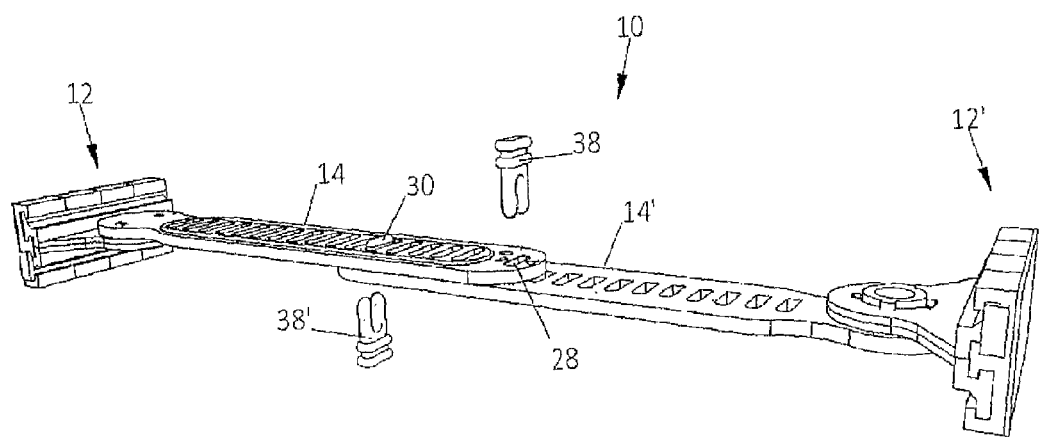
FIG. 9 is a top view illustration of a pair of assembled base units and locking arms for the first preferred embodiment of the safety device of the present invention with the locking arms connected and locking pins aligned for insertion.
Figure 10:
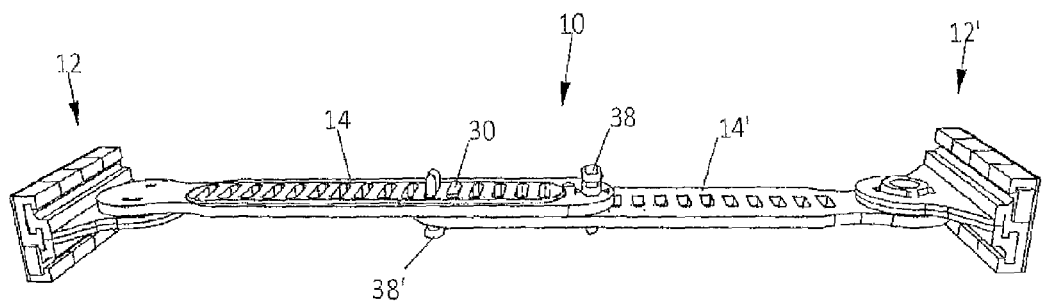
FIG. 10 is a top view illustration of a pair of assembled base units and locking arms for the first preferred embodiment of the safety device of the present invention with the locking arms connected and secured by locking pins.

As shown in FIGS. 4-6, the safety device 10 generally includes a base unit 12 and a locking arm 14. As shown in FIGS. 1-3, the base unit 12 consists of an adhesive backing layer 16, a plurality of base tracks 18, and a pair of matching eyelets 20. The plurality of base tracks 18, preferably at least four, are each identical and configured to rest side-by-side on the adhesive backing layer 16. The adhesive backing layer 16 and plurality of base tracks 18 are ideally co-extensive when attached. A front side 16a of the adhesive backing layer 16 receives the plurality of base tracks 18. The back side 16b of the adhesive backing layer 16 is configured to adhere to a wall or securing surface as described below.

When aligned on the adhesive backing layer 16, the plurality of base tracks 18 for a pair of parallel grooves 18a, 18b. These parallel grooves 18a, 18b are configured to slideably receive tongues 20a on each of a pair of matching eyelets 20. The tongues 20a on each of the matching eyelets 20 slide into one of the grooves 18a, 18b from opposite sides. Each tongue 20a ends with a stop bar 20b so that the eyelet 20 only slides into the groove 18a, 18b up to a fixed point. When the eyelets 20 are inserted into the parallel grooves from opposite sides, as shown in FIG. 2, the tongues 20a of the eyelets 20 effectively lock the base tracks 18 together. At this fixed point of insertion, pass-through openings 22 on the each of the pair of matching eyelets 20 are aligned.

The adhesive backing layer preferably comprises a super high bond adhesive tape, which is commonly available on the market, such as from 3M® or similar supplier. Adhesives are routinely replacing conventional fasteners in all facets of industry. The adhesive to be used is preferably configured to adhere extremely well to ABS plastic or similar materials as are used in constructing television cabinets. In addition, the adhesive should bond well with paint or similar materials since the wall will likely be coated in paint.

Given the construction of the base unit 12, particularly the plurality of aligned base tracks 18, the use of adhesive tape as the adhesive backing layer 16 lends itself well to the claimed safety device 10. Such adhesive tapes have a high density of adhesion and very strongly hold surfaces together, such as a plastic base to a wall. Such adhesive tapes are typically removed by stretching the tape out from one end of the plastic base.

In the present invention, the adhesive backing layer 16 is preferably co-extensive with the base unit 12 so as to present a clean appearance. In order to remove the base unit 12 from a wall, one needs only to disassemble the pair of matching eyelets 20 and remove each of the plurality of base tracks 18 one at a time. The adhesive backing layer 16 strongly holds the plurality of base tracks 18 due to the combined surface area when joined together. However, individually the base tracks 18 are much simpler to remove from the adhesive backing layer 16. The smaller base track 18 components of the base unit 12 facilitate easier removal of the same from a surface. When the eyelets 20 are removed, the individual base tracks 18 may be removed from the adhesive backing layer 16. Since the surface area of each base track 18 is very small, the amount of resistance per base track 18 is low and each may be separated from the adhesive backing layer 16 relatively easily. Once the base tracks 18 are removed, a user may remove the adhesive backing layer 16 from the television or wall by stretching as described above.

The aligned pass-through openings 22 form a connection opening 24. This connection opening 24 is configured to receive a connection lug 26 on one end of the locking arm 14. Ideally, the connection lug 26 has a pair of arms 26a disposed around its perimeter. The pair of arms 26a are configured to pass through side notches 24a on the connection opening 24 in the eyelet 20. In a particularly preferred embodiment, the side notches 24a and arms 26a are spaced so that the connection lug 26 may pass through the connection opening 24 in a single radial position and be locked together in every other radial position of the locking arm 14 rotated relative to the base unit 12.

The locking arm 14 preferably includes a locking slot 28 on an end opposite the connection lug 26. Adjacent to the locking slot 28, the locking arm 14 also has an L-shaped stud 30. The L-shaped stud 30 preferably extends from the same surface of the locking arm 14 as the connection lug 26, albeit at the opposite end. Spaced along the length of the locking arm 14 between the connection lug 26 and the L-shaped stud 30 are a plurality of adjustment slots 32. The adjustment slots 32 are generally sized and shaped so as to match the size and shape of the L-shaped stud 30. Since all of the components have generally identical constructions, each of the base units 12, 12', locking arms 14, 14', L-shaped studs 30, 30', and adjustment slots 32, 32' are identical, and any designation as first or second is merely for naming convention. The locking arms 14, 14' are more specifically mirror images of one another as to the placement of the L-shaped studs 30, 30' and the adjustment slots 32, 32' as described below. The same naming convention applies to the locking pins 38, 38', locking slots 28, 28' and sub-components of each part.

As shown in FIGS. 7-10, a first preferred embodiment of the safety device 10 preferably consists of a pair of base units 12, 12' each paired with one locking arm 14, 14'. One of the base units 12 and a connected locking arm 14 is attached to a first surface by the adhesive backing layer 16. The other of the base unit 12' and connected locking arm 14' is attached to a second surface by a second adhesive backing layer 16'. Once the distance between the first surface and the second surface is established, the L-shaped stud 30 of the first locking arm 14 is engaged with one of the adjustment slots 32' on the second locking arm 14'. Similarly, the L-shaped stud 30' of the second locking arm 14' is engaged with one of the adjustment slots 32 on the first locking arm 14. Once each of the L-shaped studs 30, 30' engage one of the adjustment slots 32', 32, the respective locking arms 14, 14' are slightly shifted side-to-side relative to each other. This shifting engages the L-shaped stud 30, 30' with the adjustment slot 32', 32 so as to secure the two locking arms 14, 14' together. The L-shaped stud 30 and the adjustment slots 32 on the first locking arm 14 oriented in opposite directions, e.g., mirror images, of the L-shaped stud 30' and adjustment slots 32' on the second locking arm 14'. This opposite orientation facilitates securing the locking arms 14, 14' together by the side-to-side shifting thereof.

Once the locking arms 14, 14' are joined in this way, locking pins 38, 38' are passed through the locking slots 28, 28' on the respective first and second locking arms 14, 14'. These locking pins 38, 38' pass through the locking slots 28, 28' and engage with a spare adjustment slot 32, 32' on the other locking arm 14, 14' aligned therewith. The locking pins 38, 38' are configured to restrict relative movement of the locking arms 14, 14' so that the L-shaped studs 30, 30' do not disengage from the adjustment slots 32', 32. When the locking arms 14 are joined in this way, the safety device 10 rigidly maintains the distance between the first surface and the second surface, thereby preventing tipping or rocking of either surface relative to the other. The strength of the adhesive backing layer 16, 16' maintains the base units 12, 12' connected to either the first or second surfaces.

In a second embodiment, the safety device 10 consists of two sets of rigid arms—one long and one short—arranged in a "V" configuration to minimize side-to-side swaying, while also creating a rigid connection that prevents forward or backward tilting that can lead to the television tipping over. Each set of rigid arms connects to the rear of the television at a single attachment point. The others ends of the rigid arms attach to the wall surface behind the television.

Figure 11:
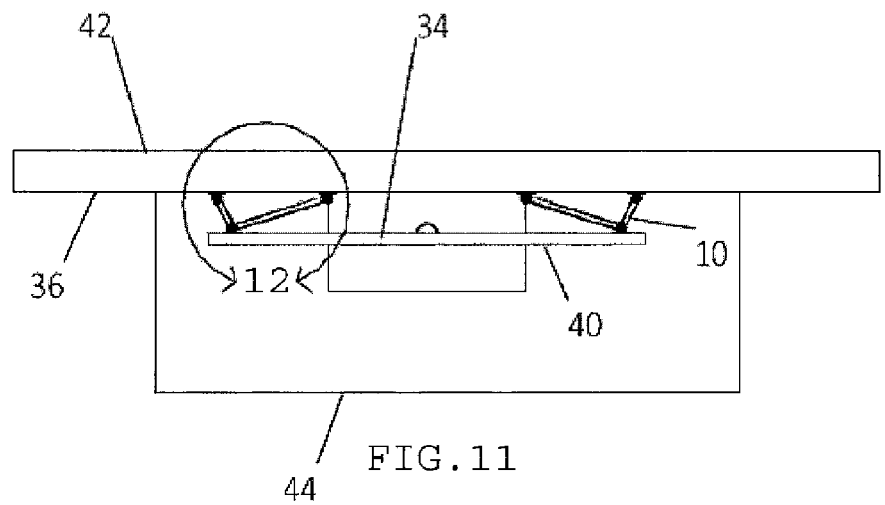
FIG. 11 is a top environmental view schematically showing a second preferred embodiment of the safety device of the present invention securing a flat-screen television to a wall.
Figure 12:
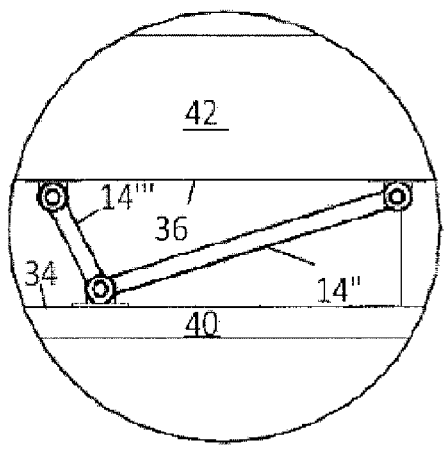
FIG. 12 is a close-up view of the second preferred embodiment of the safety device of the present invention designated by circle 12-12 in FIG. 11.
Figure 13:
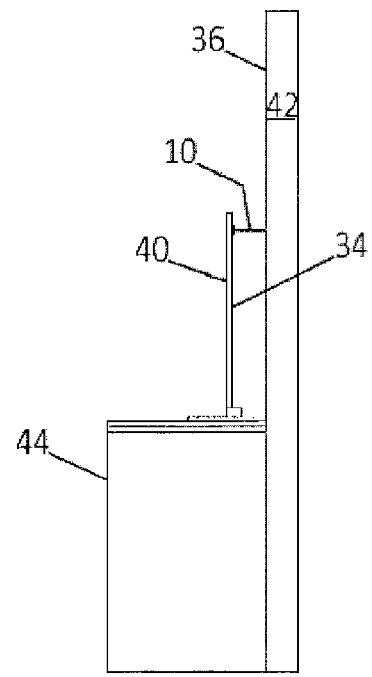
FIG. 13 is side environmental view schematically showing the second preferred embodiment of the safety device of the present invention securing a flat-screen television to a wall.
Figure 14:
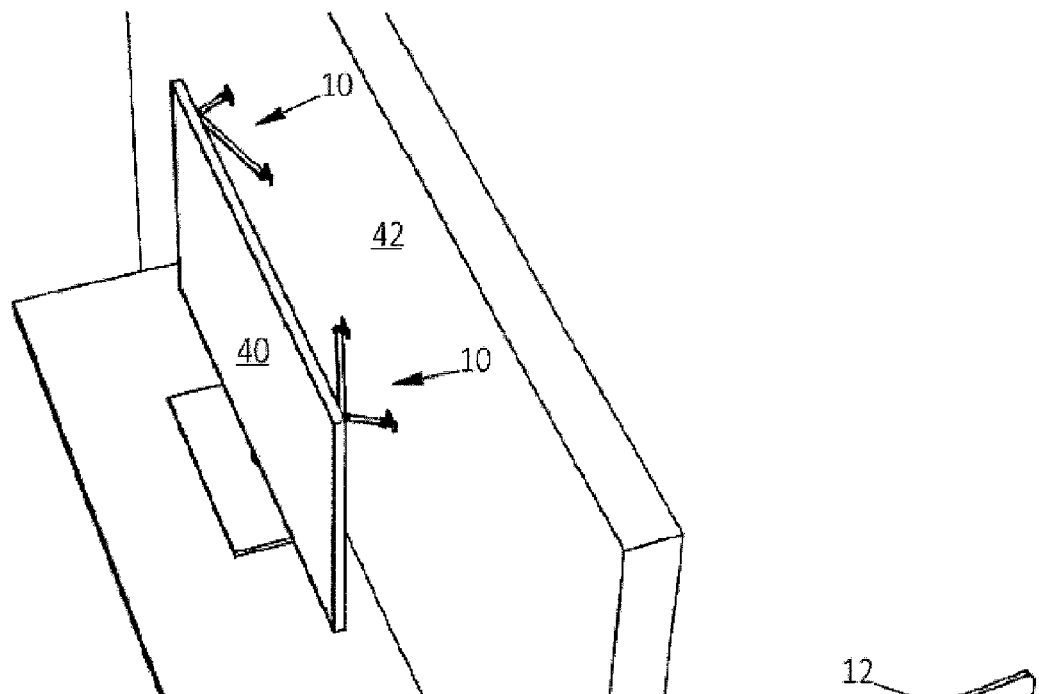
FIG. 14 is a top perspective environmental view showing the second preferred embodiment of the safety device of the present invention securing a flat-screen television to a wall.
Figure 15:
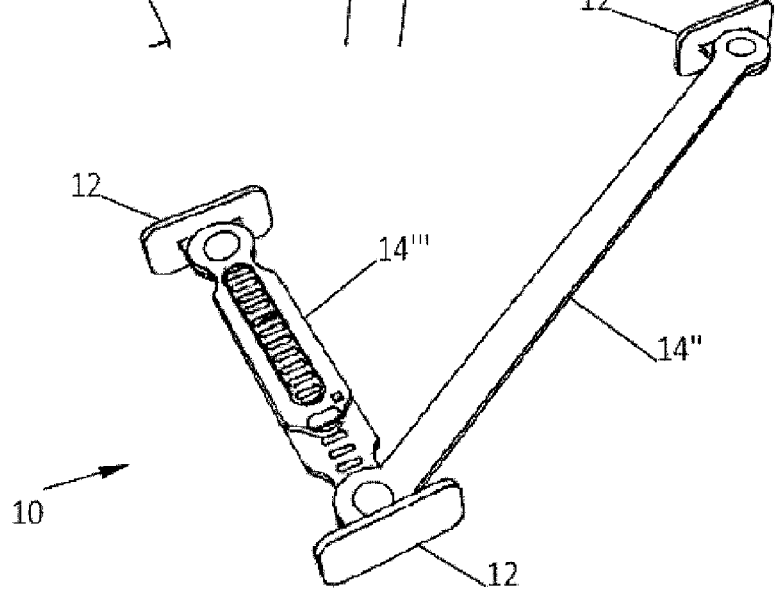
FIG. 15 is a perspective view of the second preferred embodiment of the safety device of the present invention.
Figure 16:
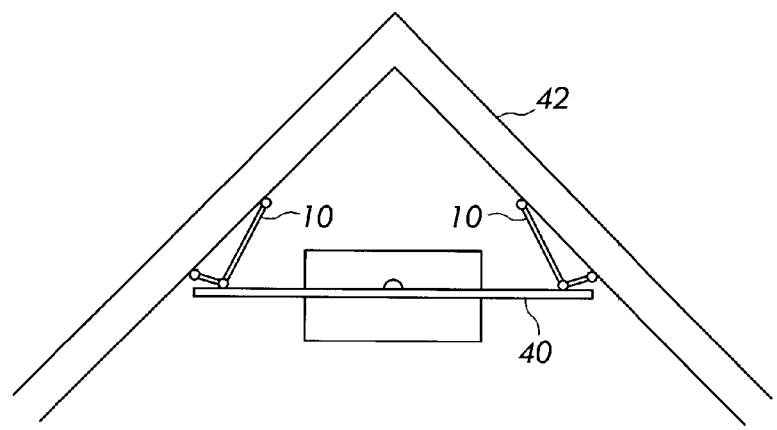
FIG. 16 is a top view of the second preferred embodiment of the safety device of the present invention securing a flat-screen television to a corner wall.

FIGS. 11-4 and 16 schematically illustrate environmental applications of the second preferred embodiment of the safety device 10 of the present invention. FIG. 15 illustrates the second preferred embodiment of the safety device 10. In this second embodiment, the safety device 10 consists of a long locking arm 14" and a short locking arm 14'". One end of each long 14" and short 14'" locking arm is jointly attached to a first surface, where the opposite ends of each long 14" and short 14'" locking arm is separately attached to a second surface. In the environmental figures, the first surface depicts a television 40 and the second surface depicts a wall 42. Together, the long 14" and short 14'" locking arms form a V-shaped bracket designed to not only prevent tipping or leaning of the television 40 in a front-to-back plane, but also rocking of the television 40 in a side-to-side plane. The television 40 preferably rests on a stand 44 or similar support device.

In this second embodiment, the short arm 14'" is adjustable as described above, which permits orienting the same perpendicular to the wall and television within a reasonable range of distances. Being perpendicular provides the most resistance with the least stress on the arm 14'" and the adhesive backing layers 16. The other arm 14" is considerably longer, intended to restrict side-to-side movement. The short arm 14'" restricts forward and backward movement, while the long arm 14" restricts side-to-side movement. Since the long arm 14" is intended to prevent side-to-side movement, it should be of a certain length such that the angle between the long arm 14" and either the wall 42 or the television 40 is no more than 45 degrees at the point of attachment. Therefore, a preferred minimum length for the long arm 14" will be the measure of the hypotenuse of an equilateral triangle that has the longest adjustable position of the short arm 14'" as the sides of the equilateral triangle. At this preferred minimum length, the long arm 14" will only become more effective at restricting side-to-side movement as the short arm 14'" is adjusted shorter and the long arm 14" extends at a smaller angle relative to the wall 42 and/or television 40.

This function of restricting side-to-side motion is secondary to the anti-tip properties of the short arm 14'", but still helpful in restricting overall movement of the television 40. Since this function is effective at multiple different angles, the long arm 14" does not need to be adjustable, and may just swing out to accommodate the situation. Any of these supposed positions will be determined at the time of installation, set up once, and then not touched again. In typical use, there will be no strain on the safety device 10 unless there is an outside force trying to move the television 40. The safety device 10 does not carry the weight of the television 40 at all. Since the location of the attachment points are largely subjective, the safety device 10 will work on an extremely wide range of television sizes, any brand, and in a majority of placement instances (between 4 and 8 inches from the wall, for example). The safety device 10 will also work for a television 40 that is placed in a corner wall. As long as the basic guideline of attaching the safety device 10 as close as possible to the upper corners of the television 40 is followed, the device can be attached with some flexibility for the consumer.

As shown in FIG. 15, the short locking arm 14''' preferably consists of a pair locking arms 14, 14' having the same or similar construction and assembly as described above for the first embodiment. The long locking arm 14'' may also have a similar two-piece construction, or may comprise a single rigid piece that is not adjustable as shown in FIG. 15. FIG. 16 illustrates how the safety device 10 may be used to secure a television 40 to walls 42 in a corner configuration. Just as the second preferred embodiment of the safety device 10 secures the television 40 to a wall 42 using two locking arms 14'', 14''', so to can the first preferred embodiment of the safety device 10 secure the television 40 to the wall using a single locking arm 14.

Figure 17:
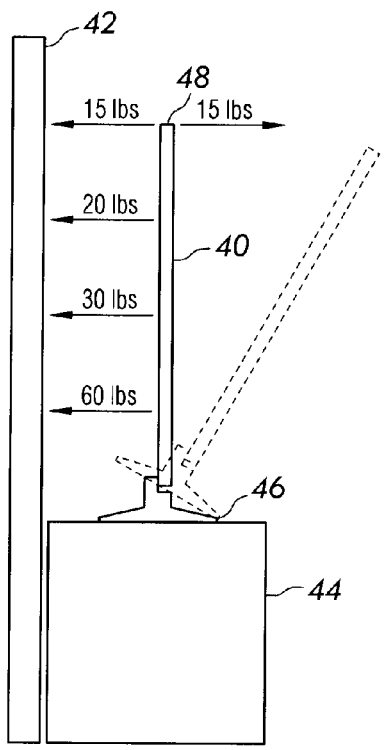
FIG. 17 is a side view illustrating force estimations needed to tip a television relative to distance from a pivot point.
Figure 18:
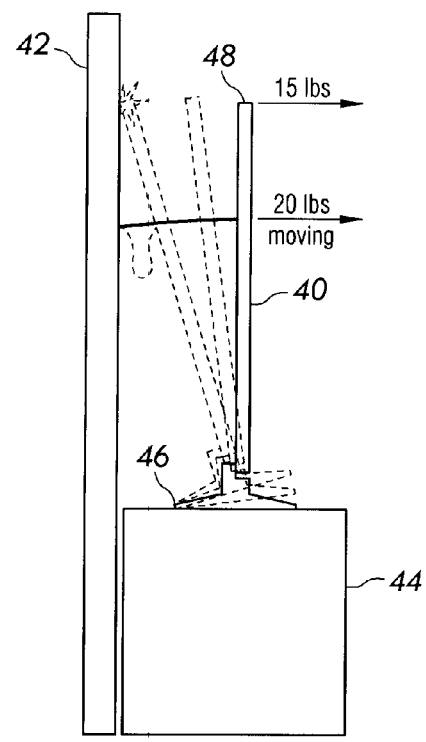
FIG. 18 is a side view illustrating rocking of a television secured by a prior art flexible strap and force estimations needed to rock a television relative to distance from a pivot point.
Figure 19:
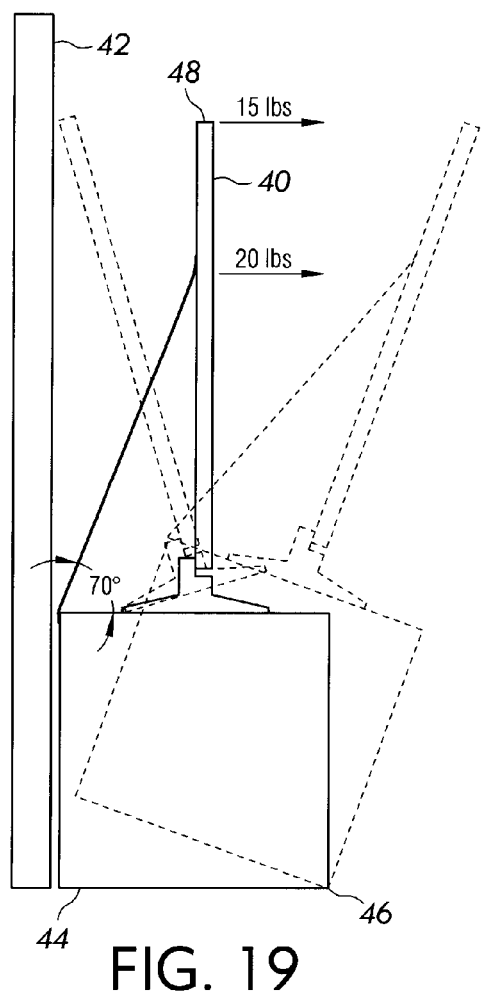
FIG. 19 is a side view illustrating hazards of securing a television to a base instead of a fixed wall.

FIGS. 17-19 schematically illustrate tipping or rocking forces acting on and various methods of securing a television 40 against the same. FIG. 17 illustrates at various heights along the television 40, the force necessary to counter forward tipping of the television 40 based upon distance from the pivot point, e.g., dynamic moment. Merely by way of example, the greatest force, e.g., the equivalent of 60 lbs, would be required near the bottom of the television 40 closest to the pivot point 46. A little greater distance from the pivot point 46 might require a slightly lesser force, e.g., the equivalent of 30 lbs. An even greater distance from the pivot point might require even less force, e.g., the equivalent of 20 lbs. The farthest distance from the pivot point 46—at the very top of the television 40—might require the least force, e.g., the equivalent of 15 lbs. Thus, it would be most beneficial to attach the safety device 10 the greatest possible distance from the potential pivot point 46, such as at the top 48 of the television 40.

FIG. 18 illustrates securing a television 40 to a wall 42 using a prior art safety strap that is flexible. In this illustration, it is shown that the flexible strap, while secured to the television 40 and the wall 42, permits the television 40 to rock backwards where the television 40 could strike the wall 42. Furthermore, once in this rocked position against the wall 42, the television 40 would then pivot forward until the safety strap reaches full extension. In this full extension, the attachment of the safety strap to the television 40 and wall 42 would be subjected to greater forces, which could result in separation and/or failure of the safety strap, leading to the television 40 falling. As above, the further the safety strap is from the pivot point 46, the lower the force necessary to counter any tipping.

FIG. 19 illustrates another prior art safety device where a strap secures the top 48 of the television 40 to a TV stand 44 or similar piece of furniture. One problem with securing a television 40 to the stand 44 is that the stand 40 is not itself fixed and the entire unit may tip or rock under enough force. While the pivot point 46 would be lowered to the bottom of the stand 44, this only increases the distance between the pivot point 46 and the top 48 of the television 40, which would require a lesser amount of force to pull the unit forward. By securing the safety device 10 to a fixed surface like the wall 42, the force required to tip the television can be effectively counter-acted.

Figure 20:
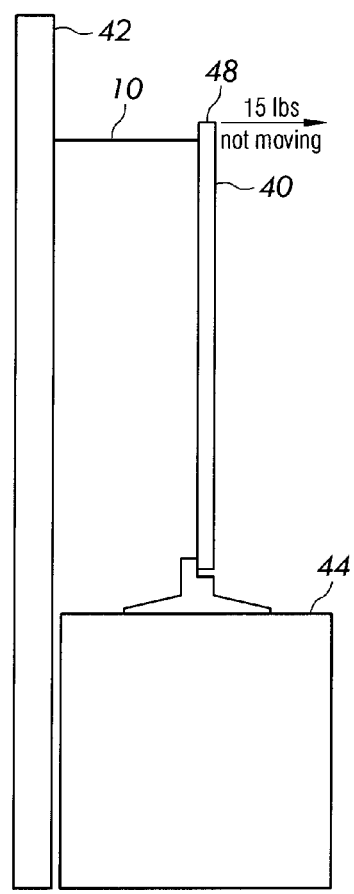
FIG. 20 is a side view illustrating a television secured to a wall by the first preferred embodiment of the safety device of the present invention.
Figure 21:
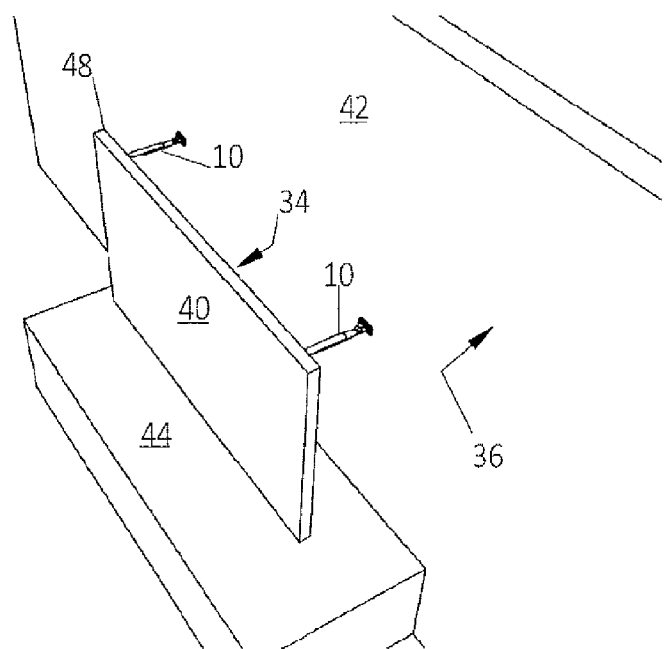
FIG. 21 is a top perspective environmental view showing the first preferred embodiment of the safety device of the present invention securing a flat-screen television to a flat wall.
Figure 22:
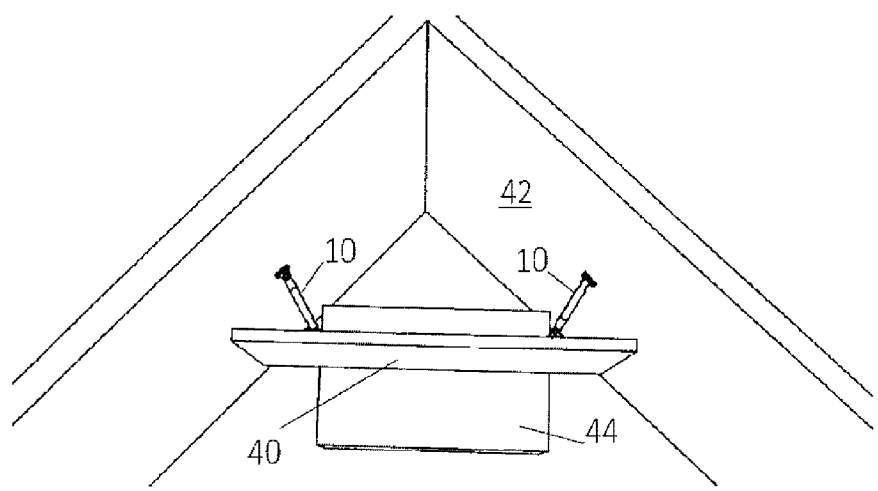
FIG. 22, is a top environmental view showing the first preferred embodiment of the safety device of the present invention securing a flat-screen television to a corner wall.

FIG. 20 illustrates use of the inventive safety device 10 on a television 40 secured to a wall 42. In this instance, either embodiment of the safety device 10, as described above, is secured to the wall 42 and the top 48 of the television 40. Because the safety device 10 is rigid, the television 40 is securely held in place against rocking or tipping forces. The safety device 10 is more than sufficient to resist the equivalent of 15 lbs of force and greater to resist tipping or rocking. As shown in FIGS. 21 and 22, multiples of the safety device 10 are preferably used, at least in pairs, so that one is attached at opposite top corners 48a, 48b of the television 40. The use of at least a pair of safety devices 10 helps prevent not only tipping or rocking of the television 40, but also twisting or similar movement.

When the safety device 10 is fully assembled, it functions as a single rigid object. This functionality distributes any outside forces exerted on the television 40 evenly across the entire surface area of the adhesive backing layer 16 and permits the adhesive basking layer 16 to maintain maximum effectiveness against pulling forces.

Although several embodiments have been described in detail for purposes of illustration, various modifications may be made without departing from the scope and spirit of the invention. Accordingly, the invention is not to be limited, except as by the appended claims.

What is claimed is:
1. A safety securing apparatus, comprising:
a first base unit pivotally connected to a first locking arm, wherein the first base unit has an adhesive backing layer configured for securing the first base unit to a first surface;
a second base unit pivotally connected to a second locking arm, wherein the second base unit has an adhesive backing layer configured for securing the second base unit to a second surface;
wherein the first base unit and the second base unit each comprise a plurality of base tracks arranged side-by-side and defining a pair of parallel grooves on each of the first base unit and the second base unit; and
a locking mechanism connecting a free end of the first locking arm to a free end of the second locking arm, wherein the locking mechanism, the first locking arm, and the second locking arm are configured to form a rigid bracket securing the first surface to the second surface.

2. The safety securing apparatus of claim 1, wherein the first base unit and the second base unit each further comprise a pair of eyelets, each eyelet having a tongue for insertion into one of the pair of parallel grooves on each of the first base unit and the second base unit.

3. The safety securing apparatus of claim 2, wherein each of the pair of eyelets further have a stop bar at one end of the tongue.

4. The safety securing apparatus of claim 1, wherein the first base unit and the second base unit each comprise connection openings in an eyelet configured to receive a connection lug on each of the first locking arm and the second locking arm.

5. The safety securing apparatus of claim 4, wherein the connection openings on the first base unit and the second base unit each have side notches configured to accept connection arms on the connection lug on each of the first locking arm and the second locking arm.

6. The safety securing apparatus of claim 1, wherein the first locking arm and the second locking arm each comprise an L-shaped stud adjacent to the free end and a plurality of adjustment slots spaced along a length of the first locking arm and the second locking arm.

7. The safety securing apparatus of claim 6, wherein the L-shaped stud on each of the first locking arm and the second locking arm is configured to engage one of the plurality of adjustment slots on the second locking arm and the first locking arm.

8. The safety securing apparatus of claim 7, further comprising a pair of locking pins configured to engage a locking slot on the free end of each of the first locking arm and the second locking arm, wherein the locking pin also engages one of the plurality of adjustment slots on the second locking arm and the first locking arm.

9. A safety securing apparatus, comprising:
- a first base unit pivotally connected to a first locking arm, wherein the first base unit comprises a plurality of base tracks and has an adhesive backing layer configured for securing the plurality of base tracks to a first surface, wherein the plurality of base tracks are arranged side-by-side and define a pair of parallel grooves on the first base unit;
- a second base unit pivotally connected to a second locking arm, wherein the second base unit comprises a plurality of base tracks and has an adhesive backing layer configured for securing the second base unit to a second surface, wherein the plurality of base tracks are arranged side-by-side and define a pair of parallel grooves on the second base unit; and
- a locking mechanism connecting a free end of the first locking arm to a free end of the second locking arm, the locking mechanism comprising an L-shaped stud on each of the first locking arm and the second locking arm adjacent to the free ends thereof and a plurality of adjustment slots spaced along a length of each of the first locking arm and the second locking arm, wherein the locking mechanism, the first locking arm, and the second locking arm are configured to form a rigid bracket securing the first surface to the second surface.

10. The safety securing apparatus of claim 9, wherein the first base unit and the second base unit each further comprise a pair of eyelets, each eyelet having a tongue for insertion into one of the pair of parallel grooves on each of the first base unit and the second base unit.

11. The safety securing apparatus of claim 10, wherein each of the pair of eyelets further have a stop bar at one end of the tongue.

12. The safety securing apparatus of claim 9, wherein the first base unit and the second base unit each comprise connection openings in an eyelet configured to receive a connection lug on each of the first locking arm and the second locking arm.

13. The safety securing apparatus of claim 12, wherein the connection openings on the first base unit and the second base unit each have side notches configured to accept connection arms on the connection lug on each of the first locking arm and the second locking arm.

14. The safety securing apparatus of claim 9, wherein the L-shaped stud on each of the first locking arm and the second locking arm is configured to engage one of the plurality of adjustment slots on the second locking arm and the first locking arm.

15. The safety securing apparatus of claim 14, further comprising a pair of locking pins configured to engage a locking slot on the free end of each of the first locking arm and the second locking arm, wherein the locking pin also engages one of the plurality of adjustment slots on the second locking arm and the first locking arm.

16. A safety securing apparatus, comprising:
- a first base unit pivotally connected to a first locking arm, wherein the first base unit comprises a pair of eyelets, a plurality of base tracks, and has an adhesive backing layer configured for securing the plurality of base tracks to a first surface, wherein the plurality of base tracks are arranged side-by-side and define a pair of parallel grooves on the first base unit, and wherein each of the pair of eyelets have a tongue for insertion into one of the pair of parallel grooves and a stop bar at one end of the tongue;
- a second base unit pivotally connected to a second locking arm, wherein the second base unit comprises a pair of eyelets, a plurality of base tracks, and has an adhesive backing layer configured for securing the second base unit to a second surface, wherein the plurality of base tracks are arranged side-by-side and define a pair of parallel grooves on the second base unit, and wherein each of the pair of eyelets have a tongue for insertion into one of the pair of parallel grooves and a stop bar at one end of the tongue; and
- a locking mechanism connecting a free end of the first locking arm to a free end of the second locking arm, the locking mechanism comprising an L-shaped stud on each of the first locking arm and the second locking arm adjacent to the free ends thereof and a plurality of adjustment slots spaced along a length of each of the first locking arm and the second locking arm, wherein the L-shaped stud on each of the first locking arm and the second locking arm is configured to engage one of the plurality of adjustments slots on the second locking arm and the first locking arm, and wherein the locking mechanism, the first locking arm, and the second locking arm are configured to form a rigid bracket securing the first surface to the second surface.

17. The safety securing apparatus of claim 16, wherein the first base unit and the second base unit each comprise connection openings in an eyelet configured to receive a connection lug on each of the first locking arm and the second locking arm.

18. The safety securing apparatus of claim 17, wherein the connection openings on the first base unit and the second base unit each have side notches configured to accept connection arms on the connection lug on each of the first locking arm and the second locking arm.

19. The safety securing apparatus of claim 16, further comprising a pair of locking pins configured to engage a locking slot on the free end of each of the first locking arm and the second locking arm, wherein the locking pin also engages one of the plurality of adjustment slots on the second locking arm and the first locking arm.

\* \* \* \* \*